Figure 1:
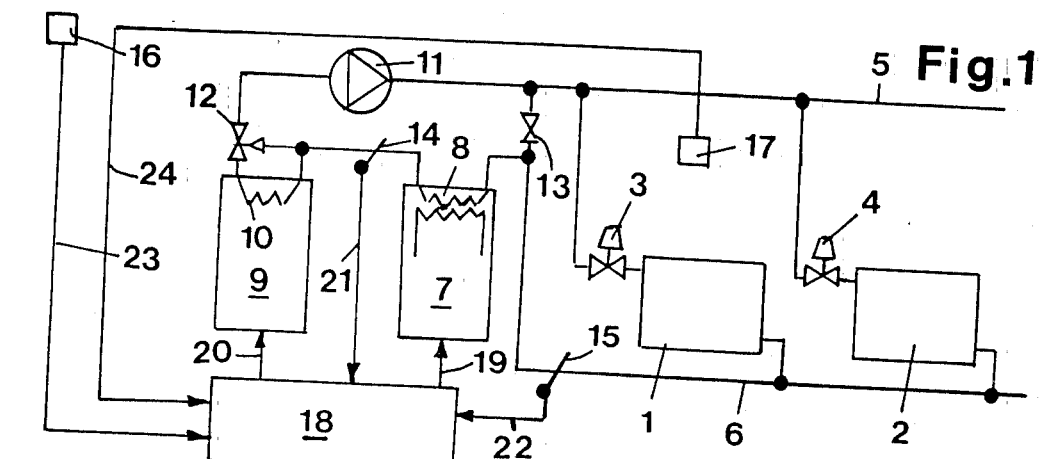

United States Patent [19]

Neldeberg et al.

[11] Patent Number: 4,576,332
[45] Date of Patent: Mar. 18, 1986

[54] HEATING INSTALLATION WITH HEAT PUMP

[75] Inventors: Poul Neldeberg, Sønderborg; Steen H. Olsen, Nordborg, both of Denmark

[73] Assignee: Danfoss A/S, Nordborg, Denmark

[21] Appl. No.: 702,941

[22] Filed: Feb. 19, 1985

[30] Foreign Application Priority Data

Mar. 2, 1984 [DE] Fed. Rep. of Germany ....... 3407795

[51] Int. Cl.⁴ ............................................. G05D 23/00
[52] U.S. Cl. ................................. 237/2 B; 236/91 F; 236/9 A; 165/39
[58] Field of Search ...................... 62/160, 159, 238.6; 237/2 B; 236/9 A, 91 F, 91 E; 165/39

[56] References Cited

FOREIGN PATENT DOCUMENTS 2641223  3/1978  Fed. Rep. of Germany .... 236/91 F
2501837  9/1982  France ................................ 237/2 B Primary Examiner—Henry Bennett
Attorney, Agent, or Firm—Wayne B. Easton

[57] ABSTRACT

The invention relates to a heating installation of the type having a heat pump, radiators having valves, and a control device having a desired value generator for controlling the upstream temperature that delivers as an effective desired value, a guided desired value guided by guide parameters such as the external temperature and/or a reference room temperature. The invention involves providing a heating installation of the aforementioned kind in which the efficiency and life of the heat pump are improved. Pursuant to this objective the control device has a comparator which compares the guided desired value with a variable limiting value higher then the downstream temperature by a predetermined temperature difference and the desired value generator reduces the effective desired value at least down to the variable limiting value when the latter is exceeded by the guided desired value.

4 Claims, 2 Drawing Figures

HEATING INSTALLATION WITH HEAT PUMP

The invention relates to a heating installation with heat pump, radiators having valves, and a control device having a desired value generator for the upstream temperature that delivers as an effective desired value a desired value controlled by a parameter such as the external temperature and/or reference room temperature.

In a known heating installation of this kind (DANFOSS Manual 'Heat pump control type ECA 5156' dated February 1983, pages 4 and 5), the heat pump can be made effective at a low load and an oil-fired boiler can be made effective at a higher load on the heating installation. The radiators are provided with thermostatic valves. The effective desired value of the upstream temperature is a function of the external temperature and can additionally be influenced by a reference room temperature. The heat pump is switched off when the downstream temperature exceeds a predetermined maximum value which can in particular be set to from 50° to 55° C. At such high temperatures of the return flow, the amount of water flowing through the condenser of the heat pump is small and the condenser temperature assumes high values, whereby the efficiency and life of the heat pump are detrimentally influenced. This occurs especially if on the one hand a higher upstream temperature is required, whether through a low external temperature or a cold reference room, and on the other hand the values on the radiators are entirely or substantially closed, whether because of sunshine or some other 'free' heat, a desired night reduction, or a wrong setting.

The invention is based on the problem of providing a heating installation of the aforementioned kind in which the efficiency and life of the heat pump are improved.

This problem is solved according to the invention in that the control device comprises a comparator which compares the controlled desired value with a variable limiting value which is higher than the downstream temperature by a predetermined temperature difference, and that the desired value generator reduces the effective desired value at least down to the variable limiting value when the latter is exceeded by the controlled desired value.

If the amount of hot water circulated in the heating installation is small because the valves are entirely or substantially closed, there is a correspondingly large amount of cooling and the downstream temperature will be low. Large differences between the upstream and downstream temperatures therefore signify a small amount of hot circulating water. When the difference between the controlled, that is to say the desired, value of the upstream temperature and the existing value of the downstream temperature is larger than the temperature difference used to form the limiting value, the effective desired value is reduced. At the given valve setting, therefore, the individual rooms will receive less heat than before. As a result, the valves are opened further, automatically in the case of thermostatic valves or manually when the resident detects a drop in the room temperature. The circulated amount of hot water therefore increases and the difference between the upstream and downstream temperatures is reduced. Since the condenser of the heat pump is traversed by large amounts of water, its differential temperature and thus the actual upstream temperature will drop. The efficiency and length of life will therefore increase. On the whole, therefore, the upstream temperature can never become larger than is appropriate for the controlled desired value. However, if the flow becomes too low, the effective desired value is reduced to such an extent that the condenser temperature can be kept low by supplying an adequate amount of water.

The desired value generator may reduce the effective desired value all the more below the limiting value, the more the controlled desired value exceeds the limiting value.

The predetermined temperature difference may be a function of the downstream temperature. However, the installation is particularly simple if the predetermined temperature difference can be set to a fixed value.

It is also favourable to have a switching-off apparatus which responds when the existing value of the upstream temperature exceeds a predetermined maximum value. In this way, the heat pump can be switched off if an excessively high upstream temperature is produced despite the control by the limiting value.

Figure 2:
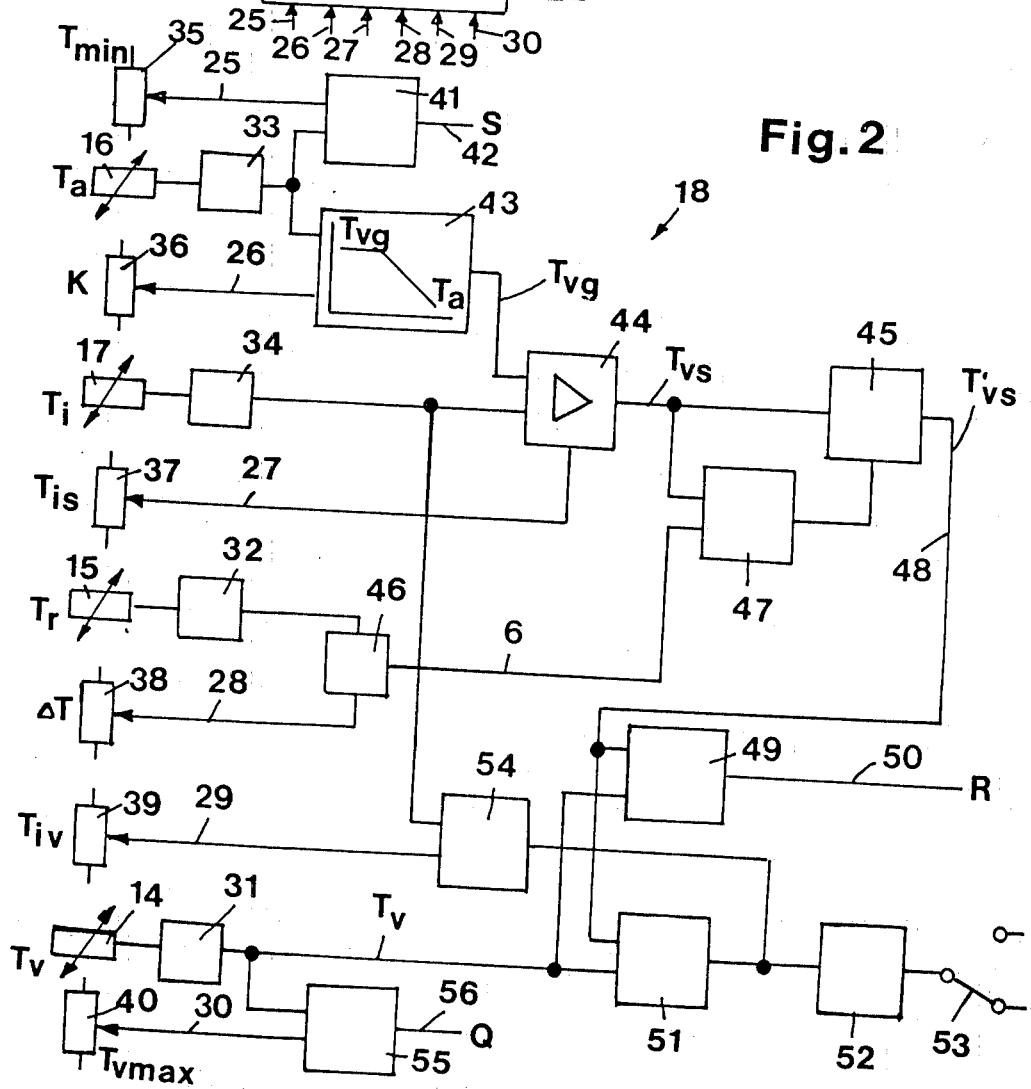

A preferred example of the invention will now be described in more detail with reference to the drawing, wherein:

FIG. 1 is the circuit diagram of a bivalent heating installation according to the invention and FIG. 2 is the circuit diagram of a control device suitable therefor.

The heating installation according to FIG. 1 comprises a plurality of radiators 1, 2 each connected to a supply or upstream conduit 5 by way of a thermostatic valve 3, 4 and having a common return or downstream conduit 6. As a heat source there is a heat pump 7, of which only the condenser 8 is shown in detail, and an oil-fired boiler 9, of which the heat exchanger 10 is shown in detail. There is also a circulating pump 11, a three-way mixing valve 12, and a bypass valve 13.

An upstream temperature sensor 14 measures the upstream temperature $T_v$ of the heat pump, and a downstream temperature sensor 15 measures the downstream temperature $T_r$ of the installation. An external temperature sensor 16 measures the external temperature $T_a$ and a room temperature sensor 17 measures the room temperature $T_i$ of a reference room. A control device 18 serves to switch on and off the heat pump 7 and the burner of the boiler 9 by way of respective control conduits 19 and 20.

The measured values of the temperature sensors 14 to 17 are transmitted to the control device 18 by way of signalling conduits 21 to 24. The control device also possesses inputs 25 to 30 for supplying adjustable parameters.

As shown in more detail in FIG. 2, each temperature sensor 14 to 17 is associated with a measuring bridge 31 to 34. Each adjusting input is connected to an adjusting device in the form of a potentiometer 35 to 40. These potentiometers are used to set the following values. The potentiometer 35 sets a minimum external temperature $T_{amin}$; the potentiometer 36 sets the inclination K of the characteristic control line; the potentiometer 37 sets a room temperature desired value $T_{is}$ for a reference room the potentiometer 38 sets a temperature difference $\Delta T$; the potentiometer 39 sets a lower room temperature $T_{iu}$; and the potentiometer 40 sets a maximum upstream temperature $T_{vmax}$.

The individual elements co-operate in the following manner. A comparator 41 compares the measured external temperature $T_a$ with the set minimum external temperature $T_{amin}$ and, by way of its outlet 42, delivers a switching-off signal S to the heat pump 7 when the external temperature falls below the set minimum value at which the heat pump can no longer operate. For example, in heat pumps of which the evaporator is subjected to the external air or water, the minimum value is at about $-3°$ C.

With the aid of the inclination factor K and the external temperature $T_a$, a desired upstream temperature $T_{vg}$ is produced in a control circuit 43 that increases with a drop in the external temperature and retains a constant upper value at very low external temperatures. This desired upstream temperature $T_{vg}$ is corrected in a correcting apparatus 44 with the aid of the control departure between the room temperature $T_i$ and the set desired value $T_{is}$, so that a guided desired value $T_{vs}$ is produced for the upstream temperature. It is normally delivered as an effective desired value $T_{vs}$, by way of a desired value generator 45.

In an adding circuit 46, the downstream temperature $T_r$ has a temperature difference $\Delta T$ added to it to form a limiting value G. This limiting value is compared in a comparator 47 with the guided desired value $T_{vs}$. When the latter exceeds the limiting value G, the desired value generator 45 is operated in such a way that the effective desired value $T'_{vs}$ is kept equal to or less than the limiting value G.

The effective desired value $T_{vs}$ taken from the outlet 48 is fed to a regulator 49 and there compared with the existing value $T_v$ of the upstream temperature, so that a corresponding regulating signal R can be derived at the outlet 50 for operating the heat pump.

A comparator 51 determines whether the existing value $T_v$ reaches the effective desired value $T'_{vs}$. If this is not the case for a prolonged period such as 45 minutes, which can be determined with the aid of a time generator 52, a change-over switch 53 is actuated which switches from sole heat pump operation to the parallel operation of the heat pump and an alternative heat source, i.e. the boiler 9. The same switching-over also takes place when the existing value $T_i$ of the reference room temperature falls below a lower room temperature value $T_{iu}$ for a longer period, which can be determined with the aid of a comparator 54. In many cases it is favourable for both of the aforementioned switching-over conditions to be interlinked not in the sense of an OR function but in the sense of an AND function.

Another comparator 55 delivers a switching-off signal Q at its outlet 56 when the existing value $T_v$ of the upstream temperature exceeds a sot maximum value $T_{vmax}$. The individual switching conditions may be indicated by signals, especially light signals.

In such an installation one can be sure that the upstream temperature is no higher than absolutely necessary, i.e. no more heat is produced than can be delivered. If in the case of higher upstream temperatures the flow decreases, for example through partial closure of the radiator valves, the downstream temperature $T_r$ and thus the limiting value G will also drop. The effective desired value $T'_{vs}$ of the upstream temperature is reduced with respect to the guided desired value $T_{vs}$. This may be desirable, for example in the case of night reduction. However it is not possible for a consumer to save heat in this manner because the room temperature drops. If he wishes to maintain the room temperature, he must open the radiator valve more. This results in a larger flow and in a lower condenser temperature in the heat pump, i.e. a higher efficiency.

A desirable value for the setting of the temperature difference $\Delta T$ is about 15° C. Depending on the downstream temperature, the variable limiting value G will then be between about 35° and 45° C. By reducing the effective desired value, the difference between the upstream and downstream temperatures may also be brought to values less than 15° C.

We claim:

1. A heating installation of the type having a heat pump, radiators having valves, and a control device having a desired value generator for controlling the upstream temperature of said radiators that delivers an effective desired value which is by controlled parameters such as the external temperature and/or a reference room temperature, characterized in that said control device includes means responsive to said external temperature and/or said room temperature to produce a controlled upstream temperature value, a comparator which compares said controlled value with a variable limiting value which is larger than the downstream temperature by a predetermined temperature difference, and that said desired value generator reduces said effective desired value at least down to said variable limiting value when the latter is exceeded by said controlled value.

2. A heating installation according to claim 1, characterized in that said desired value generator reduces said effective desired value below said limiting value in accordance with and to the extent to which said controlled value exceeds said limiting value.

3. A heating installation according to claim 1 or claim 2, characterized in that a predetermined temperature difference is added to said downstream temperature to obtain said variable limiting value.

4. A heating installation according to claim 1 characterized by a switching off apparatus which responds when said upstream temperature exceeds a predetermined maximum value.

* * * * *